US005161419A

United States Patent [19]

Moy et al.

[11] Patent Number: 5,161,419

[45] Date of Patent: Nov. 10, 1992

[54] POWER WINDOW ACTUATOR

[75] Inventors: Curtis T. Moy, Grand Blanc; Orest Iwasiuk, Farmington Hills, both of Mich.

[73] Assignee: Masco Industries, Inc., Taylor, Mich.

[21] Appl. No.: 709,956

[22] Filed: Jun. 4, 1991

[51] Int. Cl.[5] ............ F16H 21/16

[52] U.S. Cl. ............ 74/42; 74/89.14; 49/324

[58] Field of Search ............ 74/42, 89.14; 49/324, 49/340

[56] References Cited

U.S. PATENT DOCUMENTS

| | | | |
|---|---|---|---|
| 1,644,691 | 8/1926 | Pritchard | 49/341 X |
| 2,237,576 | 4/1941 | Rakoczy | 49/324 |
| 2,371,336 | 2/1942 | Levon | 268/3 |
| 2,767,979 | 10/1956 | Hummert | 49/324 |
| 3,020,039 | 2/1962 | Hynes et al. | 49/324 |
| 3,320,698 | 7/1965 | Hummel | 49/340 |
| 3,452,479 | 7/1969 | Bentley | 49/324 |
| 3,481,076 | 12/1969 | Bedard | 49/279 |
| 3,534,630 | 10/1970 | Schwerdhofer | 74/89.14 X |
| 3,713,346 | 1/1973 | Chamberlain et al. | 74/42 |
| 4,068,799 | 1/1978 | Brodin | 236/49 |
| 4,186,524 | 2/1980 | Pelchat | 49/324 |
| 4,246,628 | 1/1981 | Izemizu et al. | 74/42 X |
| 4,249,771 | 2/1981 | Gergoe et al. | 296/146 |
| 4,305,228 | 12/1981 | Nelson | 49/252 |
| 4,420,185 | 12/1983 | Bienert et al. | 49/324 X |
| 4,471,251 | 9/1984 | Yamashita | 310/89 |
| 4,511,129 | 4/1985 | Kishino | 296/146 |
| 4,534,223 | 8/1985 | Hamaguchi | 74/89.14 X |
| 4,860,493 | 8/1989 | Lense | 49/279 |
| 4,866,882 | 9/1989 | Cappello | 49/324 |
| 4,885,948 | 12/1989 | Thrasher, Jr. et al. | 74/89.14 |
| 4,903,435 | 2/1990 | Bittman | 49/340 |
| 4,918,865 | 4/1990 | Hirai | 49/347 |
| 4,970,826 | 11/1990 | Richmond et al. | 49/340 X |
| 4,987,791 | 1/1991 | Nakahashi et al. | 74/89.14 X |

FOREIGN PATENT DOCUMENTS

| | | | |
|---|---|---|---|
| 0170989 | 2/1986 | European Pat. Off. | 49/324 |
| 3522706 | 1/1986 | Fed. Rep. of Germany . | |
| 3741615 | 6/1989 | Fed. Rep. of Germany | 49/324 |
| 11070 | of 1911 | United Kingdom . | |
| 531285 | 1/1941 | United Kingdom . | |
| 688417 | 3/1953 | United Kingdom . | |

*Primary Examiner*—Rodney H. Bonck
*Assistant Examiner*—Andrea Pitts
*Attorney, Agent, or Firm*—Myron B. Kapustij; Malcolm L. Sutherland

[57] ABSTRACT

A direct drive power window actuator for remote opening and closing of a pivotable quarter window of an automotive vehicle comprising a reversible motor, a power transmitting gear device operatively connected with the motor at one end and with a rotary shaft at the other end for rotating the rotary shaft, and a window mounted linkage for converting the rotational torque of the rotary shaft into an opening-and-closing force for the window.

22 Claims, 3 Drawing Sheets

POWER WINDOW ACTUATOR

FIELD OF THE INVENTION

The present invention relates to a power window actuator and more particularly to a power window actuator for a swingably or pivotably mounted window such as a rear side vent or quarter window of a vehicle such as a van or the like.

BACKGROUND OF THE INVENTION

It is often desirable to provide a powered rear side vent or rear quarter window for ventilation purposes in vehicles, particularly vans and mini-vans. These rear side vent or quarter windows are generally swingably mounted and open outwardly of the vehicle body, and are typically remotely activated, as for example from the driver's seat.

Several types of vehicle power vent window actuators are known and used. Problems associated with these known types of window openers include their high cost, large and cumbersome size, and indirect drive arrangement employing cables with the motor being distant from the window. Thus, for example, U.S. Pat. No. 4,186,524 discloses a vehicle power window actuator for pivoting a glass view panel about an axis by means of back-and-forth linear movement of a wire cable. The wire cable has a jack screw portion swaged to one end engaging a gear which is rotated by an electric motor (which normally is placed in a location removed from the window such as in the trunk) to produce linear movement of the cable. The other end of the wire cable is swadge-attached to a rigid curved rod terminating in a ball-shaped end portion. The curved end is housed in an arcuate hollow support assembly which is attached to the vehicle body adjacent the movable edge portion of the window panel so as to direct the end portion of the curved rod against the panel. A connector assembly between the end portion of the curved rod and the window accommodates linear movement of the ball-shaped portion in a direction parallel with the plane of the glass as the window pivots outward. In addition, the end portion moves with and rotates with respect to the glass.

Likewise, U.S. Pat. No. 4,918,865 discloses a power window opener for operation of a quarter window of an automobile comprising an actuating device, an electric motor, and pull cable transmitting power from the motor (which is physically removed from the actuating device) to the actuating device. The actuating device has a pulley, a rotary shaft connected to the pulley, and a link mechanism for converting a rotational torque of the rotary shaft into an opening-and-closing force for a wing member of the window. The pull cables are connected with the pulley so that reciprocal pull operation through the motor causes reciprocal rotation of the pulley.

There is thus a need for a relatively simple, direct drive, inexpensive, and compact actuator for swingably mounted rear quarter power windows of vehicles such as, for example, vans and mini-vans. The present invention provides such an actuator.

SUMMARY OF THE INVENTION

In accordance with the present invention there is provided a vehicle power window direct drive actuator for pivoting a window outwardly of a vehicle body about an axis. The actuator comprises driving means comprised of a reversible electric motor; power transmitting means engaged with the driving means and with a rotary shaft for rotating said rotary shaft, and a window linkage assembly mounted on said window and engaged with said rotary shaft for converting the rotational torque of the rotary shaft into an opening-and-closing force for the window. The power transmitting means comprise a gear train engaged at one end thereof with the driving means and at the other end with the rotary shaft. The rotary shaft is in turn engaged with the window linkage assembly. The linkage assembly converts the rotational torque of the rotary shaft in a certain direction into a window opening force and a rotational torque in the opposite direction, caused by reversing the driving means, into a window closing force.

The actuator of the instant invention is a direct drive actuator. By direct drive actuator is meant that the driving device (motor) is located adjacent the window and transmits power to the window linkage assembly by means of gears and shafts, and, unlike the indirect drive actuators disclosed in U.S. Pat. Nos. 4,186,524 and 4,918,865, no cables are present as power transmitting members. This results in a smaller, simpler, less cumbersome and generally more economical actuator.

BRIEF DESCRIPTION OF THE DRAWINGS

FIG. 6 is an enlarged side elevational sectional view of the actuator device of FIG. 1 with the top section of the housing removed to show the gear train.

DETAILED DESCRIPTION OF THE PREFERRED EMBODIMENT

Figure 1:
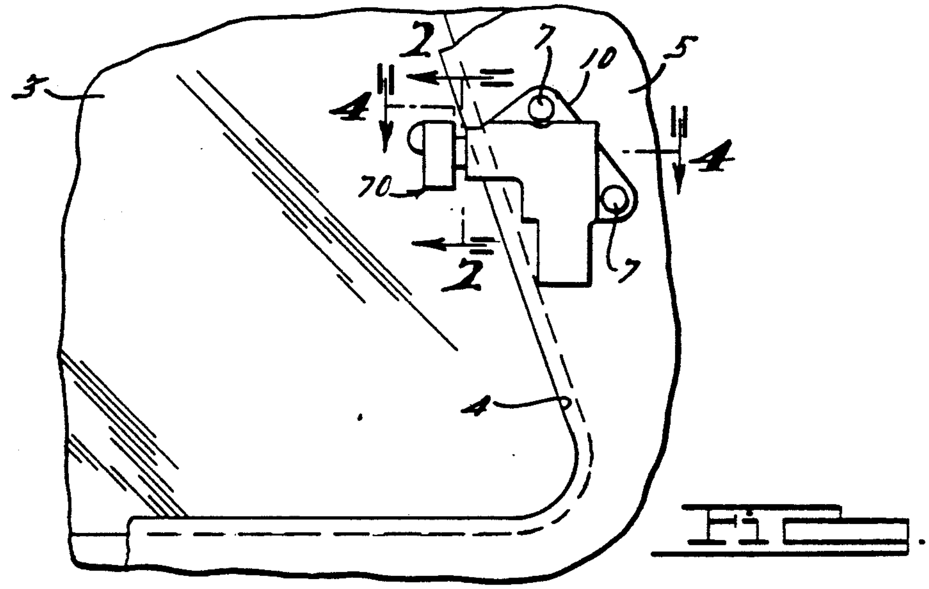
FIG. 1 is a side elevational view showing the window actuator attached to a vehicle window with the window in the closed position.

As shown in FIG. 1 of the drawings, the power window actuator 10 is mounted in the interior of a vehicle on a side body panel portion of the vehicle by attachment means 7 such as bolts, screws, and the like. More particularly the actuator 10 is mounted on the side sheet metal, for example, on the side post or pillar 5, adjacent the rear edge 4 of the rear side vent or quarter window 3. The quarter window 3 is mounted o the side body panel portion to swing laterally outward with respect to the body about an axis along the forward edge cf the window. The swinging movement is controlled by window actuator 10.

The window actuator 10 comprises a small electric motor 11 having an output shaft 12. The motor 11 is reversible and has circuit means associated therewith, including switch means for selectively activating the motor alternately in either direction at a switch location remote from the motor. Output shaft 12 has a worm 14 at one end 16 thereof. Worm 14 meshes with worm gear 22 of gear train 20.

Gear train 20 is operatively engaged at one end thereof with worm 14 of output shaft 12 of motor 11 and at the other end with rotary shaft 50. Gear train 20 is comprised of worm gear 22, gear 24, gear 26, gear 28 and gear 29. As best seen in FIG. 6 worm gear 22 and gear 24 are coaxially disposed on gear shaft 30. Gear shaft 30 is rotatably mounted at its two ends 31 and 32 in bearings 41, 42 in housing 60. Gears 26 and 28 are coaxially disposed on gear shaft 34. Gear shaft 34 is rotatably mounted at its two ends 35 and 36 in bearings 43, 44 in housing 60. Gear 29 is disposed on gear shaft 37. One end 38 of gear shaft 37 is rotatably mounted in bearing 45 in housing 60 The other end 39 of gear shaft 37 is fixedly attached against rotation to rotary shaft 50, so that rotation of gear shaft 37 will result in rotation of rotary shaft 50.

Rotation of output shaft 12 results in rotation of worm 14. When worm 14 rotates it causes rotation of worm gear 22 with which it meshes. Rotation of worm gear rotates gear shaft 30 on which worm gear 22 is disposed. Rotation of gear shaft 30 causes rotation of gear 24. Rotation of gear 24 causes gear 26, with which gear 24 meshes, to rotate. Rotation of gear 26 results in rotation of gear shaft 34. Rotation of gear shaft 34 results in rotation of gear 28. Rotation of gear 28 rotates gear 29 with which gear 28 is meshed. Rotation of gear 29 results in rotation of gear shaft 37, and consequent rotation of rotary shaft 50.

Rotation of rotary shaft 50 results in rotation of serrated portion 51 at the periphery of the free end of rotary shaft 50. Serrated portion 51 engages and actuates the window linkage assembly 70 thereby resulting in opening and closing the window. The window linkage assembly 70 and its operation is generally described in U.S. Pat. No. 4,918,865, incorporated herein by reference. The window linkage assembly 70 comprises a first link member 71 and a second link member 72. The first link member 71 has a base end provided with a through hole 73 and a free end provided with a pin-joint-hole 74. The inner peripheral surface of hole 73 has a serrated portion which receives the serrated portion 51 of rotary shaft 50. Furthermore, the first link member 71 has a hollow boss 79 in which is disposed rotary shaft 50.

The second link member 72 comprises a main plate 75 and a rib 76 projecting in a lateral direction. The rib 76 has an L-shaped form and an L-shaped cross-section and functions as a reinforcing member and a stop for first link member 71. The second link member 72 has an end **72*a* having a clevice-like form provided with a pin-joint hole 77. By aligning this pin-joint hole 77 with the pin-joint hole 74 of the first link member 71 and then inserting a pin 78 through the holes 77 and 74, the first link member 71 and the second link member 72 are rotatably joined together. The second link member 72 is provided with joint means at the free end thereof for attachment to attaching means 80 fixed to window glass pane 3. The attaching means 80 comprise, in the embodiment illustrated, a mounting bracket comprised of a bracket arm 83 and bracket plate 82 attached to window glass pane 3. The joint means may, as illustrated, be ball joint means comprising a ball joint 81 pivotally inserted into a socket of attaching means 80**.

In operation rotation of rotary shaft 50 in one direction results in rotation of the first link member in the same direction. Thus, for example, clockwise rotation of rotary shaft 50 causes rotation of first link member 71 in a clockwise direction. The second link member 72 is pushed to extend, as shown in FIG. 3, and open the window. Counterclockwise rotation of rotary shaft 50 results in counterclockwise rotation of the first link member 71. The second link member 72 is pulled to a folded position, as shown in FIG. 2, to close the window.

Figure 2:
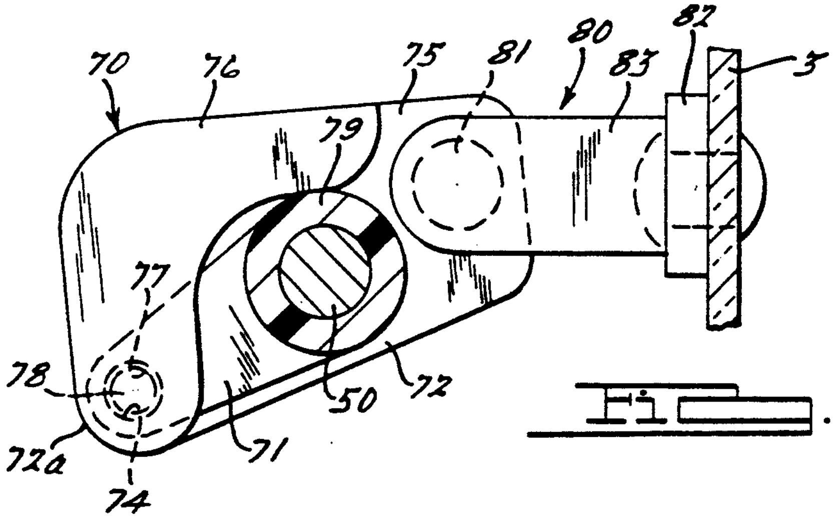
FIG. 2 is an enlarged view taken along line 2—2 in FIG. 1 showing the window linkage mechanism with the window in the closed position.
Figure 3:
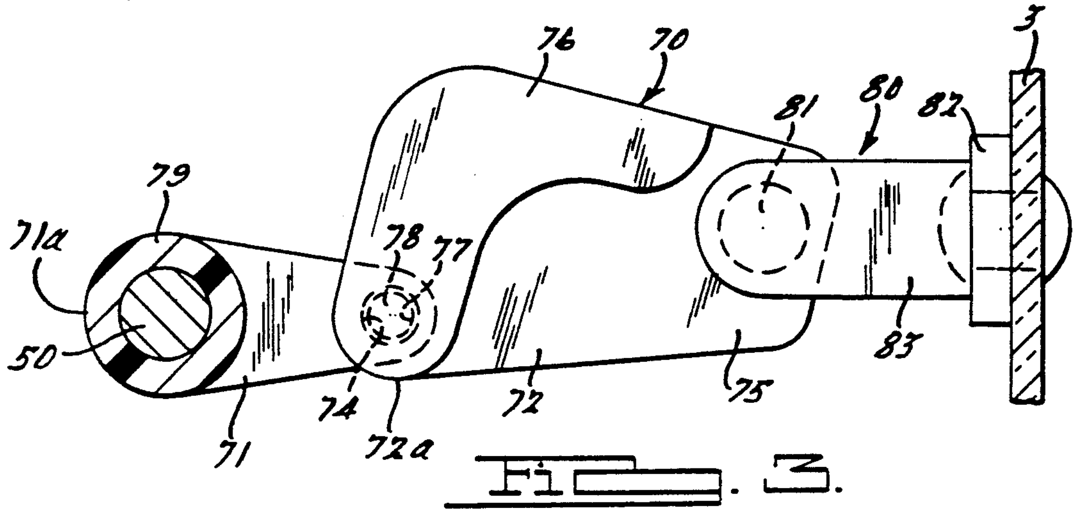
FIG. 3 is similar to FIG. 2 except with the window in the open position and the window linkage mechanism in an extended position.
Figure 4:
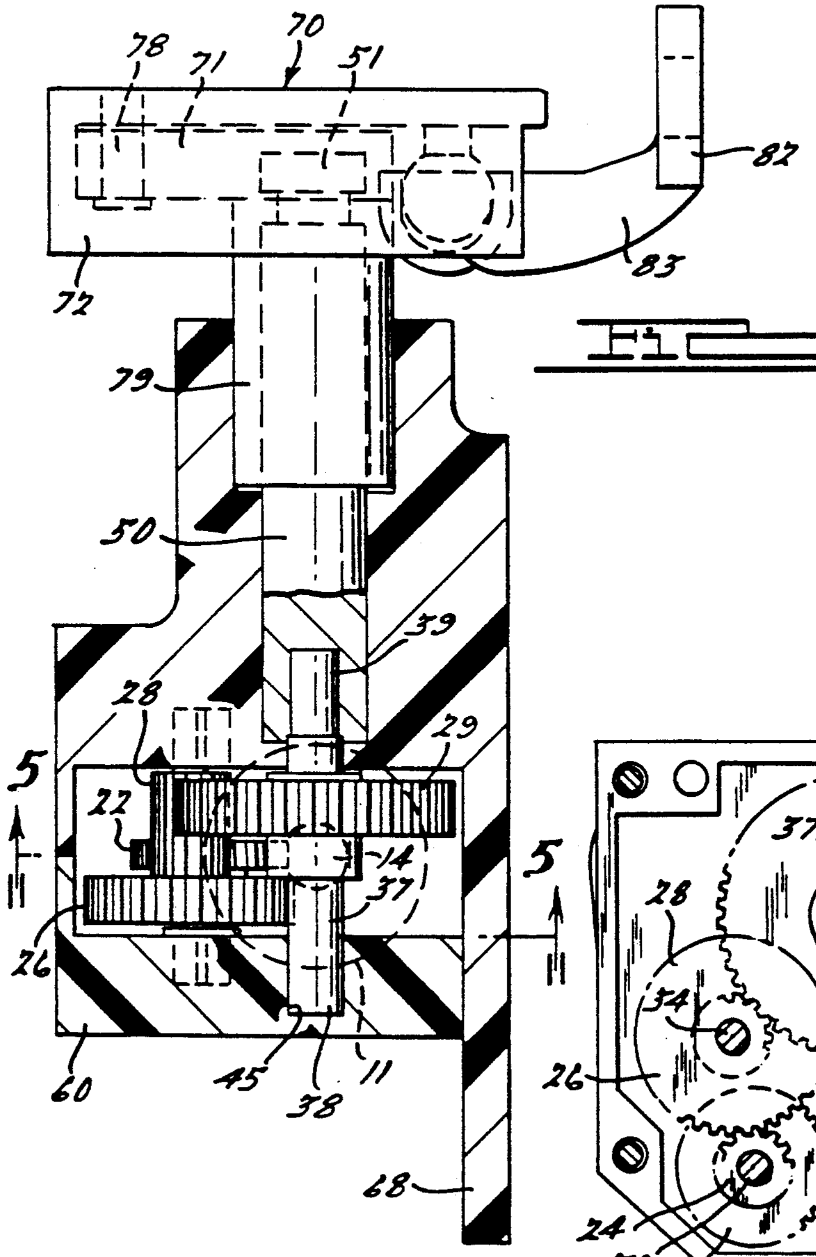
FIG. 4 is an enlarged sectional view taken along line 4—4 in FIG. 1.
Figure 5:
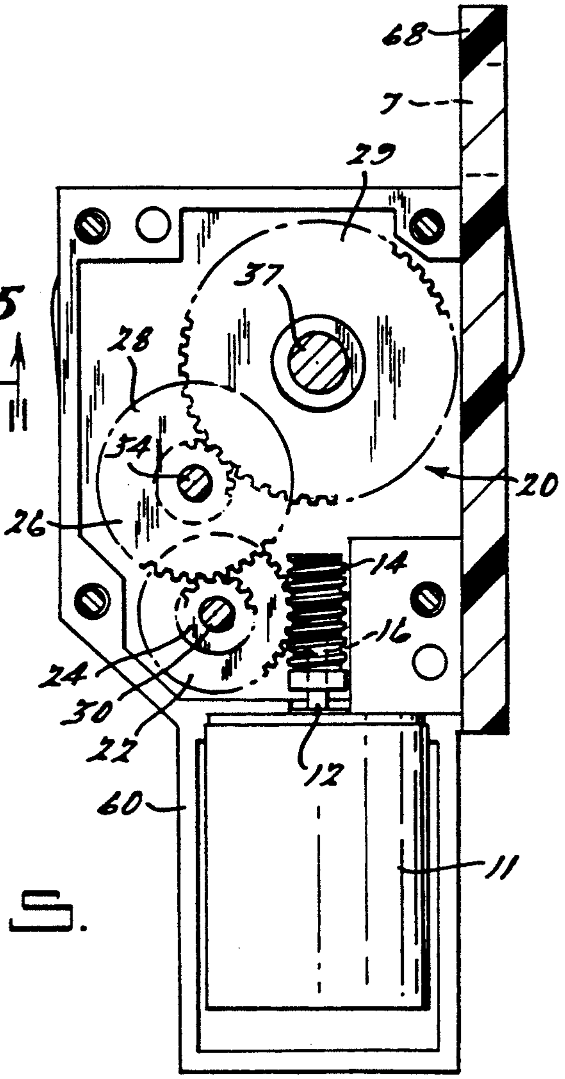
FIG. 5 sectional view taken along line 5—5 in FIG. 4.
Figure 3:
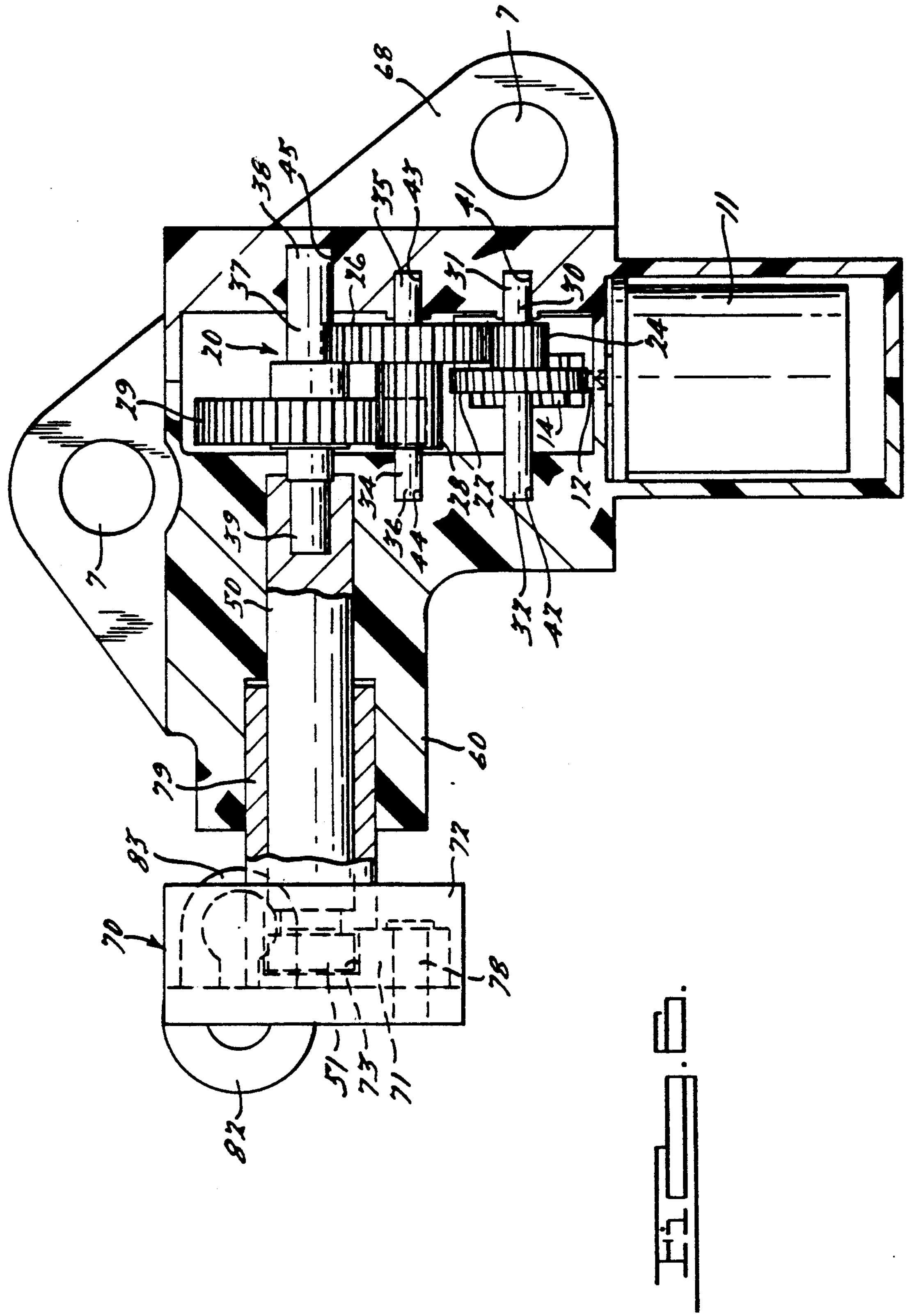

FIG. 2 illustrates the window 4 in a closed position. In this position the first link member 71 cannot be rotated further in a counterclockwise direction because end **71*a* and boss 79 of link member 71 abut against rib 76 of second link member 72**.

As best shown in FIG. 6 the motor 11, gear train 20 and part of rotary shaft 50 are disposed in housing 60. For ease of manufacture and installation housing 60 is comprised of two sections, a top section and a bottom section which are fastened together by fastening means once the motor 11, gear train, and rotary shaft are placed in one section of the housing.

Housing 60 is attached to the side sheet body of the vehicle by fastening means 7 which extend through flange 68 of the housing 60.

This invention may be further developed within the scope of the following claims. Accordingly, the above specification is to be interpreted as illustrative of only a single operative embodiment of the present invention, rather than in a strictly limited sense.

What is claimed is:

1. A direct drive power window actuator for pivotally opening and closing a pivotable vehicle window comprising:

housing;

reversible driving means comprising an electric motor disposed in said housing;

power transmission gear means disposed in said housing and operably engaged with said driving means comprising a sequential gear train containing a plurality of gears having teeth wherein the teeth of each gear are engaged with the teeth of only one other gear;

a rotary shaft having a longitudinal axis disposed in said housing and operably engaged adjacent one end with said power transmission gear means so that operation of said power transmission gear means causes rotation of said rotary shaft about its longitudinal axis; and linkage means operably engaged at one end with said window and operably engaged at the other end with said rotary shaft for converting the rotational motion of said rotary shaft into an opening or closing movement of said window.

2. The actuator of claim 1 wherein said linkage means comprises a first link attached to another end of said rotary shaft, and a second link having an end pivotally attached to said first link and another end pivotally attached to an attaching bracket mounted on said window.

3. The actuator of claim 2 wherein said attaching bracket is mounted on the window pane of said window.

4. The actuator of claim 1 wherein said electric motor has an output shaft having a worm rotatable with said output shaft.

5. The actuator of claim 4 wherein said rotary shaft has a gear engaged with a gear of said gear train, whereby rotation of said gear on said rotary shaft causes rotation of said rotary shaft about its longitudinal axis.

6. The actuator of claim 5 wherein said linkage means comprises a first link attached to another end of said rotary shaft, and a second link having an end pivotally attached to said first link and another end pivotally attached to an attaching bracket mounted on said window.

7. The actuator of claim 6 wherein said attaching bracket is mounted on the window pane of said window.

8. The actuator of claim 7 wherein said window is a side window of a motor vehicle.

9. The actuator of claim 4 wherein said worm is mounted on one end of said output shaft, and is adapted to rotate with said output shaft.

10. The actuator of claim 9 wherein said gear train comprises a worm gear engaged with said worm, a first gear having teeth and having a smaller diameter than said worm gear rotatable with said worm gear, a second gear having teeth and having a larger diameter than said first gear, said teeth of said second gear engaged with said teeth of said first gear, and a third gear having teeth and having a smaller diameter than said second gear rotatable with said second gear, said teeth of said third gear engaged with the teeth of said gear of rotary shaft.

11. The actuator of claim 10 wherein said first gear is coaxial with said worm gear, and said second gear is coaxial with said third gear.

12. A direct drive powered window actuator for pivotally opening and closing a pivotable vehicle window, said window including a free swinging edge, comprising:

housing mounted to the vehicle body adjacent said free swinging edge of said window;

reversible electric motor disposed in said housing containing an output shaft containing a worm rotatable with said output shaft;

sequential gear train disposed in said housing, said gear train comprised of a plurality of gears having teeth wherein the teeth of each gear are engaged with the teeth of only one other gear including a worm gear operably engaged with said worm;

a rotary shaft having a longitudinal axis disposed in said housing, said rotary shaft having a gear having teeth adjacent one end thereof operably engaged with the teeth of a gear of said gear train whereby operation of said gear train causes rotation of said gear of said rotary shaft and of said rotary shaft about its longitudinal axis; and linkage means comprising a first link operably engaged with the other end of said rotary shaft, and a second link having one end pivotally connected to said first link and the other end pivotally connected to an attaching means mounted on said window, said linkage means converting the rotation of said rotary shaft into an opening or closing motion for said window.

13. The actuator of claim 12 wherein said gear train comprises a worm gear engaged with said worm, a first gear having teeth coaxial and rotatable with said worm gear, a second gear having teeth, the teeth of said second gear engaged with said teeth of said first gear, and a third gear having teeth coaxial and rotatable with said second gear, the teeth of said third gear engaged with the teeth of said gear on said rotary shaft.

14. The actuator of claim 13 wherein said attaching means are mounted on the window pane of said window.

15. The actuator of claim 14 wherein said window is a side window of a motor vehicle.

16. A direct drive actuator for pivotally opening and closing a pivotally mounted vehicle window comprising:

a housing mounted adjacent said window;

reversible electric motor disposed in said housing, said electric motor having an output shaft with a worm mounted on one end;

a rotary shaft having a longitudinal axis and rotating about said axis rotatably disposed in said housing, said shaft having a gear having teeth adjacent one end;

sequential gear train disposed in said housing intermediate said output shaft and said rotary shaft comprising a plurality of gears having teeth including a worm gear engaged with said worm, a first gear having teeth coaxial and rotatable with said worm gear, a second gear having teeth, the teeth of said second gear engaged with the teeth of said first gear, and a third gear having teeth coaxial and rotatable with said second gear, the teeth of said third gear engaged with the teeth of said gear on said rotary shaft; and linkage means operably connecting said shaft to said window, said linkage means translating the rotational movement of said shaft into an opening and closing movement of said window.

17. The actuator of claim 16 wherein said housing is mounted on said vehicle adjacent a free edge of said window.

18. The actuator of claim 16 wherein said first gear has a smaller diameter than said worm gear, said second gear has a larger diameter than said first gear, said third gear has a smaller diameter than said second gear, and said gear on said rotary shaft has a larger diameter than said third gear.

19. The actuator of claim 18 wherein said linkage means comprises a first link engaged with the other end of said shaft, and a second link pivotally attached to said first link at one end and pivotally attached to attaching means on said window at the other end.

20. The actuator of claim 16 wherein said linkage means comprises a first link engaged with the other end of said shaft, and a second link pivotally attached to said first link at one end and pivotally attached to attaching means and said window at the other end.

21. The actuator of claim 20 wherein said attaching means are mounted on the window pane of said window.

22. The actuator of claim 21 wherein said window is a side window of a motor vehicle.

* * * * *